United States Patent [19]

Goto

[11] 4,396,266

[45] Aug. 2, 1983

[54] MOTOR DRIVE DEVICE

[75] Inventor: Tetsuro Goto, Tokyo, Japan

[73] Assignee: Nippon Kogaku K.K., Tokyo, Japan

[21] Appl. No.: 401,245

[22] Filed: Jul. 23, 1982

Related U.S. Application Data

[63] Continuation of Ser. No. 238,411, Feb. 26, 1981, abandoned.

[30] Foreign Application Priority Data

Mar. 13, 1980 [JP] Japan .............................. 55-32675[U]

[51] Int. Cl.³ ............................................. G03B 1/18
[52] U.S. Cl. ................................. 354/173; 354/266
[58] Field of Search ................................. 354/173, 266

[56] References Cited

U.S. PATENT DOCUMENTS

| 3,852,779 | 12/1974 | Yamamichi | 354/173 |
| 4,268,148 | 5/1981 | Wakabayashi | 354/173 |
| 4,278,337 | 7/1981 | Mashimo | 354/173 |
| 4,281,912 | 8/1981 | Maida | 354/173 |

Primary Examiner—Russell E. Adams

[57] ABSTRACT

In a motor drive device mountable on a camera having manually operable first switch means, a magnet adapted to be energized by actuation of the first switch means and release a shutter, and first release lock means manually operated to render only the first switch means inoperable, there is provided manually operable second switch means adapted, when mounted on the camera, to be parallel-connected to the first switch means, and second release lock means manually operated to render only the second switch means inoperable.

4 Claims, 2 Drawing Figures

MOTOR DRIVE DEVICE

This is a continuation, of application Ser. No. 238,411, filed Feb. 26, 1981, now abandoned.

BACKGROUND OF THE INVENTION

1. Field of the Invention

This invention relates to a motor drive device mountable on a camera, and more particularly to the release device thereof.

2. Description of the Prior Art

Electromagnetic release mechanisms for effecting the shutter release of a camera by energization of a magnet have heretofore been widely adopted in cameras. In some cameras using such electromagnetic release mechanisms, a release lock mechanism manually operated so that the electromagnetic release mechanism of the camera cannot inadvertently be operated has been adopted. Also, a motor drive device (hereinafter referred to as MD) is provided with a release button for operating the electromagnetic release mechanism on the camera side, and with a lock mechanism manually operated to lock the operation of the release button for the same purpose as described above.

To operate the release button on the camera side or on the MD side when a camera, as described above, is used with an MD mounted thereon, both the release lock mechanism on the camera side and the release lock mechanism on the MD side must be released and this has been operationally cumbersome.

SUMMARY OF THE INVENTION

It is an object of the present invention to provide an MD in which only the release lock mechanism on the camera side has to be released to operate the release mechanism on the camera side and only the release lock mechanism on the MD side has to be released to operate the release mechanism on the MD side.

The invention will become fully apparent from the following detailed description thereof taken in conjunction with the accompanying drawings.

DESCRIPTION OF THE PREFERRED EMBODIMENT

Figure 1:
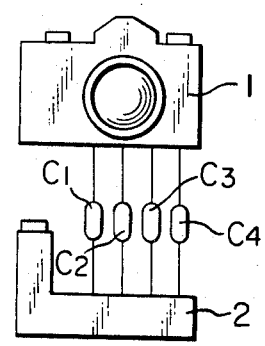
FIG. 1 shows the connection between a camera and an MD.

The invention will hreinafter be described with respect to an embodiment thereof shown in the drawings.

FIG. 1 shows a combination of a camera 1 and an MD 2 using the embodiment of the present invention. Between the two, electrical signals are connected by connectors $C_1$–$C_4$.

Figure 2:
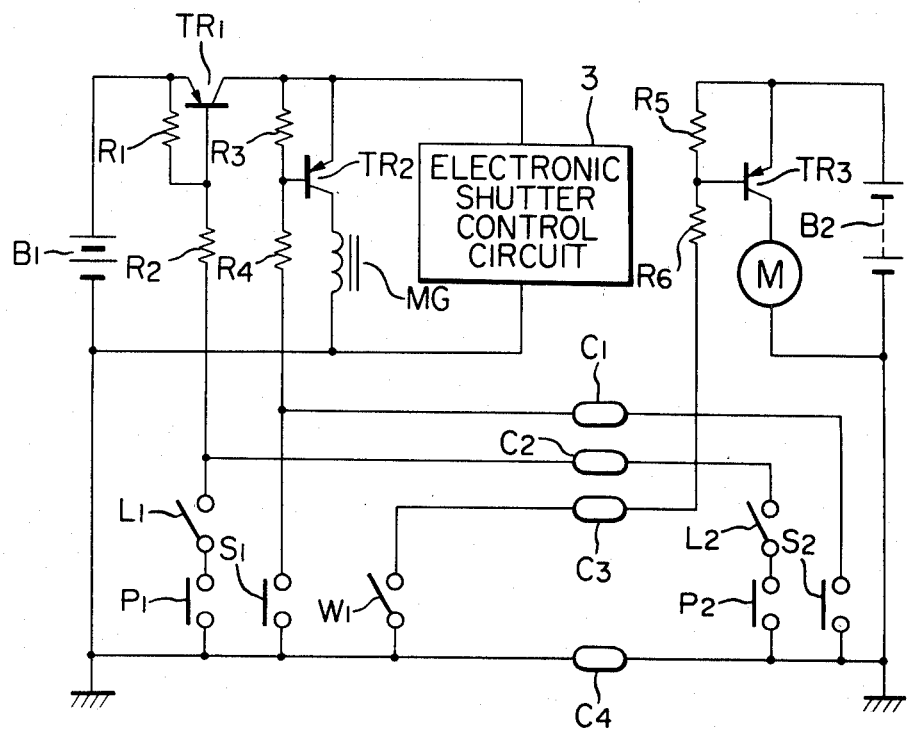
FIG. 2 is a circuit diagram in which the camera and MD according to the present invention are combined.

FIG. 2 shows a specific example of the circuit in FIG. 1. Transistors $TR_1$ and $TR_2$ and resistors $R_1$–$R_4$ associated therewith are connected as shown between the terminals of a battery $B_1$ for the camera. A coil MG for a release magnet is connected between the collector of the transistor $TR_2$ and the negative terminal of the battery $B_1$. An electronic shutter control circuit 3 is provided on the camera side and it includes a reaward shutter curtain stopping magnet (not shown).

A main switch $P_1$ adapted to be closed in response to half-depression operation of a release button is connected to the battery $B_1$, and a locking switch $L_1$ for locking the switch $P_1$ is provided. Also, a release switch $S_1$, adapted to be closed when the release button is further depressed, is provided and associated with the switch $P_1$. A wind-up completion switch $W_1$ is further provided on the camera side and it is adapted to be closed at a point of time corresponding to the completion of movement of the rearward curtain of a focal plane shutter and to be opened when wind-up is completed.

The operation of the camera side is as follows:

When the main switch $P_1$ is closed with the locking switch $L_1$ being in its ON position, the transistor $TR_1$ conducts and the current from the battery $B_1$ is supplied to a circuit including the transistor $TR_2$ and thus, the device becomes ready to operate.

When the release switch $S_1$ is closed after the closing of the main switch $P_1$, the coil MG for the release magnet is electrically energized through the transistor $TR_2$ and the forward shutter curtain moves. Subsequently, the rearward shutter curtain also moves after the lapse of a shutter time controlled by the electronic shutter control circuit 3. As previously mentioned, the wind-up completion switch $W_1$ is closed at the point of time corresponding to the completion of movement of the rearward curtain and is opened when wind-up is completed.

When the wind-up completion switch $W_1$ on the camera side is closed, a signal is supplied to the MD side because the camera 1 and the MD 2 are connected together by the connectors as previously described. The transistor $TR_3$ of the MD is turned on by a signal supplied through the connector $C_3$ and therefore, a wind-up motor M is rotated and starts to wind up a film. As described above, the connector $C_3$ is for the wind-up completion switch, while the connectors $C_1$, $C_2$ and $C_4$ respectively are for the release switch, for the main switch via the lock switch, and for the grounding.

To cause the camera to operate on the MD side, a release locking switch $L_2$ on the MD side may be closed and the release button on the MD side may be depressed and the main switch $P_2$ on the MD side may be closed, whereafter the release switch $S_2$ on the MD side may be closed, whereby the release circuit on the camera side may be operated and a series of operations may proceed.

In the above-described embodiment, electrical contacts are used as the locking switches $L_1$ and $L_2$, but alternatively, these switches may be replaced by a release lock mechanism in which the release button cannot mechanically be depressed.

According to the present invention, as described above, a so-called single operation becomes possible in which the operation of the camera can be effected by the release buttons of the camera and the MD, respectively, if the lock device of one of the camera side and the MD side is only released (ON).

I claim:

1. In a motor drive device mountable on a camera, said camera having:

first switch means operable to effect power supply to an electric circuit in the camera, second switch means operable to effect a shutter release operation, a magnet energized upon actuations of said first and second switch means to release the shutter, first disabling means operable to disable power supply effected by the first switch means, the improvement comprising:

third switch means operable, when mounted on said camera, to be parallel-connected to said first switch means to effect power supply to the camera, fourth switch means operable, when mounted on said camera, to be parallel-connected to said second switch means and to release the shutter, and second disabling means operable to disable power supply effected by said third switch means.

2. A motor drive device according to claim 1, wherein said second disabling means is connected in series with said third switch means.

3. In a motor drive device mountable on a camera, the camera having first switch means operable to effect power supply therethrough to an electric circuit in the camera, and first disabling means operable to disable power supply effected through the first switch means, the improvement comprising:

second switch means adapted, when mounted on said camera, to be parallel-connected to said first switch means; and second disabling means operable to disable power supply effected through said second switch means.

4. A motor drive device according to claim 3, wherein said second disabling means is connected in series with said second switch means.

* * * * *